US006669131B2

(12) United States Patent
Takehara et al.

(10) Patent No.: US 6,669,131 B2
(45) **Date of Patent: *Dec. 30, 2003**

(54) SEATBELT RETRACTOR

(75) Inventors: Hiroki Takehara, Tokyo (JP); Tetsuya Hamaue, Tokyo (JP)

(73) Assignee: Takata Corporation, Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 09/840,292

(22) Filed: Apr. 24, 2001

(65) Prior Publication Data

US 2001/0040199 A1 Nov. 15, 2001

(30) Foreign Application Priority Data

Apr. 24, 2000 (JP) ....................................... 2000-122067

(51) Int. Cl.[7] ................................................ B60R 22/34
(52) U.S. Cl. .......................... 242/374; 280/807; 60/632
(58) Field of Search .......................... 242/374; 280/807, 280/806; 297/478; 60/632

(56) References Cited

U.S. PATENT DOCUMENTS 4,138,922 A * 2/1979 Richter et al. ................. 85/62
5,364,168 A * 11/1994 Nishizawa et al. ......... 297/476
5,881,962 A * 3/1999 Schmidt et al. ............. 242/374
6,416,008 B1 * 7/2002 Fujii et al. ............... 242/379.1
6,419,176 B1 * 7/2002 Mizuno ...................... 242/374

FOREIGN PATENT DOCUMENTS

DE 195 12 660 10/1995

* cited by examiner

*Primary Examiner*—John Q. Nguyen
(74) *Attorney, Agent, or Firm*—Foley & Lardner

(57) ABSTRACT

A seat belt retractor has a pretensioner, which has a cover with integral projections made of aluminum. A pretensioner gear with complementary holes is attached to the cover, with the projections inserted into the holes to immobilize the pretensioner gear. A spool driving gear for driving a spool of the retractor is spaced and disengaged from the pretensioner gear so that the pretensioner gear does not interfere with normal operation of the spool. To tension the seat belt, the pretensioner gear is driven to break the projections to mobilize the pretensioner gear, engage the pretensioner gear with the spool driving gear, and drive the spool driving gear, which rotates the spool and tension the seat belt.

18 Claims, 4 Drawing Sheets

11
23
15a
20
18a
20b
18b
20a
15
21
18
22
24
15b
16
25
14
13
12

1
2
3
4
5
6
7
8
9
10
11
12
13
14
15
16
17
18
19
20

SEATBELT RETRACTOR

BACKGROUND

Seat belts are used in automobiles to protect occupants during a collision. When a collision is detected or anticipated, a pretensioner can be used to take up slack and tighten against the occupant to a greater extent than it is under a normal use state.

SUMMARY OF THE INVENTION

The present invention relates to a seat belt retractor, a pretensioner thereof, and a method of tensioning a seat belt.

One aspect of the present invention is a seat belt retractor having a spool for tensioning a seat belt and a pretensioner.

Another aspect of the present invention is the pretensioner itself mentioned above. The pretensioner according to the present invention can include a stationary body, a pretensioner gear, a spool driving gear, and a pretensioner gear driving mechanism.

The pretensioner gear can be attached to the stationary body using a plurality of integrally formed breakable projections inserted into a plurality of complementary holes so that the pretensioner gear is immobilized relative to the stationary body. One of the pretensioner gear and the stationary body can have the integrally formed breakable projections and the other of the pretensioner gear and the stationary body can have the complementary holes. For example, the breakable projections can be integrally formed with the stationary body while the complementary holes can be formed on one side of the pretensioner gear.

The pretensioner gear, for example, can be a ring gear having outer teeth and inner teeth, and the spool driving gear, for example, also can be a ring gear having outer teeth and inner teeth. The spool can include a spool gear that engages the inner teeth of the spool driving gear.

The complementary holes can be blind holes to retain broken projections within the holes so that they do not fall out of the pretensioner gear. The stationary body and the projections, for example, can be formed of aluminum. The stationary body, for example, can be a cover.

The spool driving gear, which is adapted for rotating the spool, can be spaced and disengaged from the pretensioner gear so that the pretensioner gear does not interfere with normal operation of the spool.

The pretensioner gear driving mechanism is for engaging the pretensioner gear with the spool driving gear and driving the pretensioner gear to thereby rotate the spool. The pretensioner gear driving mechanism drives the pretensioner gear to break the projections and mobilize the pretensioner gear, engage the pretensioner gear with the spool driving gear, and drive the spool driving gear, which rotates the spool and tension the seat belt.

The pretensioner gear driving mechanism can include a conduit, balls, and a ball propelling mechanism. The conduit can have an opening and the pretensioner gear can be positioned adjacent to the opening so that part of the pretensioner gear extends into the opening. The balls are positioned inside the conduit for driving the pretensioner gear. The ball propelling mechanism can move the balls inside the conduit so that the balls force against the portion of the pretensioner gear extending into the opening to break the projections, engage the pretensioner gear with the spool driving gear, and rotate the spool driving gear to tension the seat belt.

The ball propelling mechanism can comprise a gas generator disposed at one end of the conduit and a piston situated inside the conduit. Activating the gas generator generates gas that propels the piston against the balls to drive the balls against the portion of the pretensioner gear extending into the opening. The balls engage the outer teeth of the pretensioner gear, and the outer teeth of the spool driving gear engage the inner teeth of the pretensioner gear to rotate the spool.

The projections can include first and second projections, with the first projection positioned closer to the opening through which a leading ball passes than the second projection so that the leading ball the conduit breaks the first projection first, and then breaks the second projection.

The second projection can be positioned away from the first projection so that when the first projection breaks, the pretensioner gear pivots about the second projection to cause the inner teeth of the pretensioner gear to engage the outer teeth of the spool driving gear away from a position at which the leading ball pushes the pretensioner gear. In this respect, the second projection can be spaced away from the first projection by at least a quarter of the circumferential distance of the pretensioner gear.

Another aspect of the present invention is a method of tensioning the seat belt in the seat belt retractor having the spool. The method can comprise the steps of providing the stationary body and the pretensioner gear, which can be attached to the stationary body with the integrally formed breakable projections inserted into the complementary holes so that the pretensioner gear is immobilized relative to the stationary body. Again, one of the pretensioner gear and the stationary gear can have the integrally formed breakable projections and the other of the pretensioner gear and the stationary body can have the complentary holes, with the projections inserted into the complementary holes. The method further comprises providing the spool driving gear for rotating the spool and positioning the spool driving gear spaced and disengaged from the pretensioner gear so that the pretensioner gear does not interfere with normal operation of the spool. The method also includes driving the pretensioner gear to break the projections and mobilize the pretensioner gear, engaging the pretensioner gear with the spool driving gear, and driving the spool driving gear to rotate the spool and tension the seat belt.

The pretensioner gear can be driven by providing the conduit provided with the opening and positioning the pretensioner gear adjacent to the opening so that part of the pretensioner gear extends into the opening. Balls are provided inside the conduit. Moving the balls against the portion of the pretensioner gear extending into the opening breaks the projections, engages the pretensioner gear with the spool driving gear, and rotates the spool driving gear to tension the seat belt.

The balls can be moved or propelled by providing the gas generator disposed at one end of the conduit and providing a piston situated inside the conduit. Activating the gas generator propels the piston against the balls.

DETAILED DESCRIPTION

Figure 2:
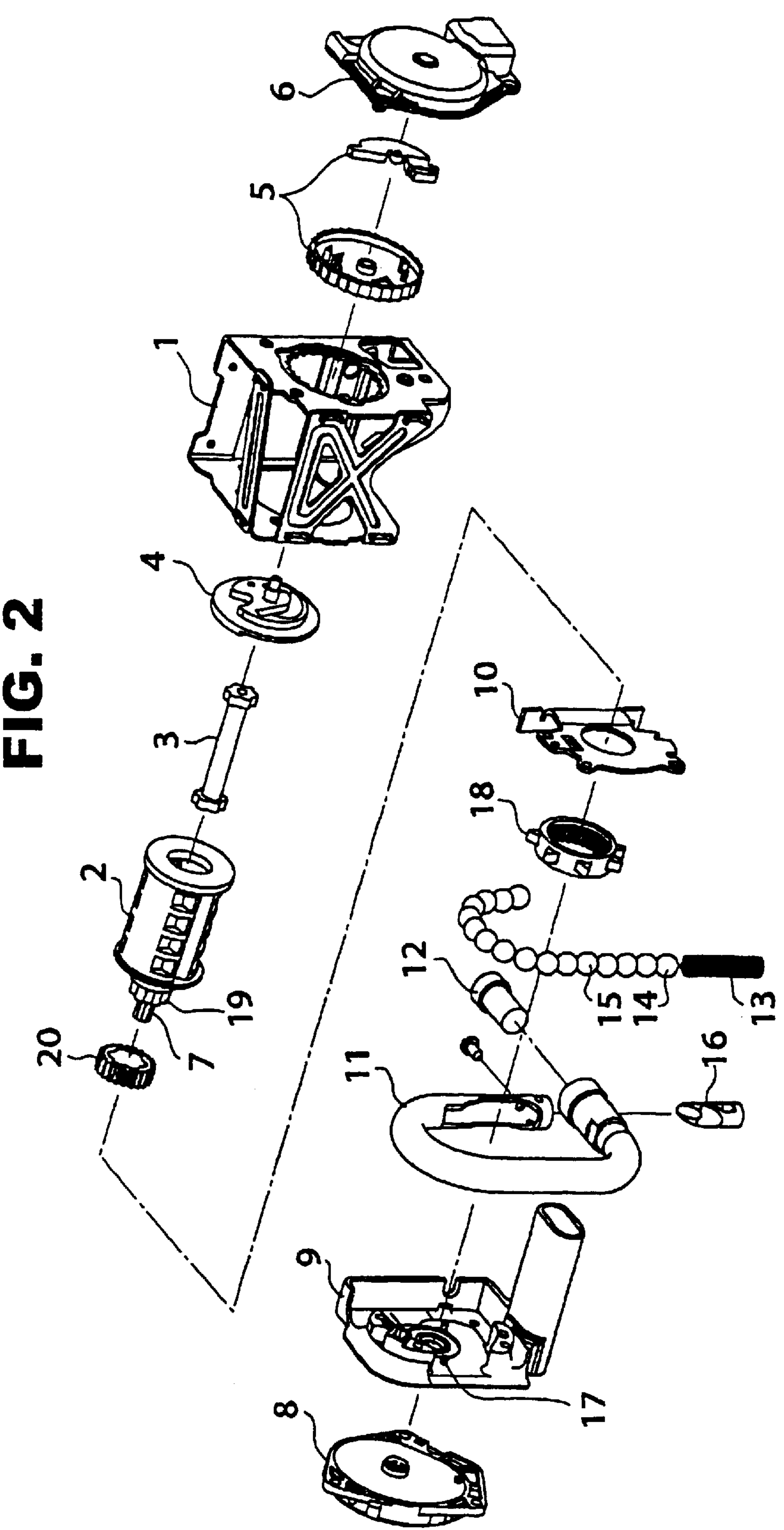
FIG. 2 is an exploded view of a seat belt retractor having a pretensioner.

FIG. 2 illustrates an exploded view of a seat belt retractor with the pretensioner according to the present invention. The seat belt retractor includes a base-frame 1 and a spool 2 rotatably mounted relative to the base frame 1. Rotating the spool 2 in one direction winds the seat belt (not shown) therearound to take up slack in the seat belt. The spool 2 uses a torsion bar 3 as its axis. A retainer 6 supports the torsion bar 3 via a lock mechanism 4 and 5. One end of the spool 2 has a gear 7, which engages another gear (not illustrated) positioned inside a return-spring cover 8. A return spring (not illustrated) in the return-spring cover 8 urges the spool 2 in the direction that takes up slack in the seat belt.

Figure 1:
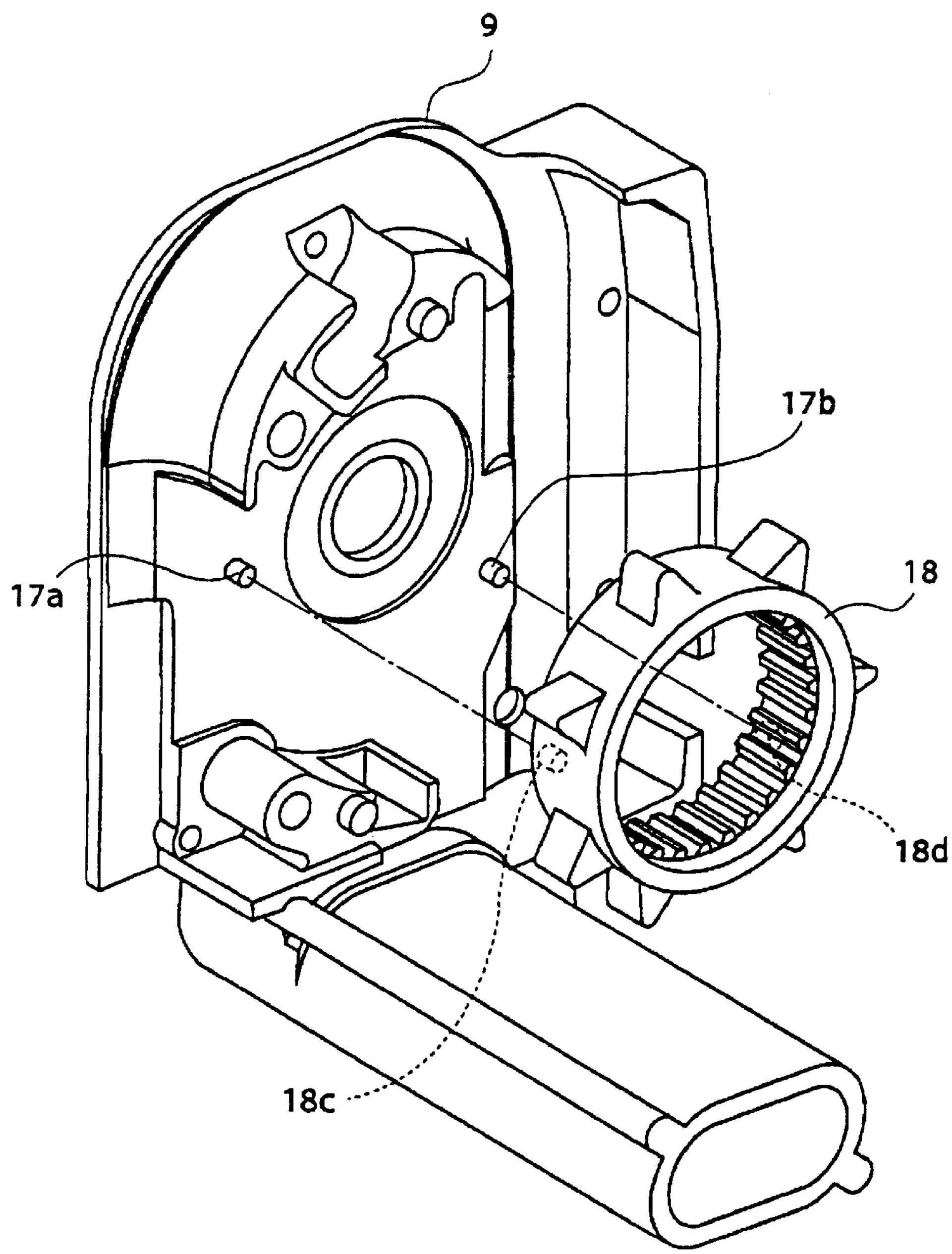
FIG. 1 is a drawing showing a pretensioner cover and a pretensioner gear of a seat belt retractor according to an embodiment of the present invention.

Referring to FIGS. 1 and 2, the seat belt retractor according to the present invention further includes a pretensioner. The pretensioner can include a stationary body 9, such as a cover, a pretensioner gear 18, a spool driving gear 20, and a pretensioner gear driving mechanism. The pretensioner gear 18 can be attached to the cover 9 using a plurality of integrally formed breakable projections 17*a*, 17*b* and a plurality of complementary holes 18*c*, 18*d* so that the pretensioner gear 18 is immobilized relative to the stationary body 9.

One of the pretensioner gear 18 and the stationary body 9 can have the integrally formed breakable projections 17 (17*a*, 17*b*) and the other of the pretensioner gear 18 and the stationary body 9 can have the complementary holes 18*c*, 18*d*. The projections 17 are inserted into the complementary holes 18*c*, 18*d*. In the embodiment illustrated, the breakable projections 17 are integrally formed with the stationary body 9 while the complementary holes 18*c*, 18*d* are formed on one side of the pretensioner gear.

The spool driving gear 20, which is adapted for rotating the spool 2, is spaced and disengaged from the pretensioner gear so that the pretensioner gear 18 does not interfere with normal operation of the spool 2, i.e., normal winding and unwinding of the seat belt.

Upon activation, the pretensioner gear driving mechanism drives the pretensioner gear 18 to break the projections 17 and mobilize the pretensioner gear 18, engage the pretensioner gear 18 with the spool driving gear 20, and drive the spool driving gear 20, which rotates the spool 2 and tension the seat belt.

The pretensioner gear driving mechanism includes a conduit 11, balls 15, and a ball propelling mechanism. The conduit 11 has an opening or cutout, adjacent to which the pretensioner gear is positioned so that part of the pretensioner gear 18 extends into the opening. The balls 15 are positioned serially inside the conduit 11 for driving the pretensioner gear 18. The ball propelling mechanism can move the balls 15 inside the conduit 11 so that the balls 15 force against the portion of the pretensioner gear 18 extending into the opening to break the projections, engage the pretensioner gear 18 with the spool driving gear 20, and rotate the spool driving gear 20 to tension the seat belt.

The ball propelling mechanism can be a gas generator 12 disposed at one end of the conduit 11 and a piston 14 situated inside the conduit 11. The conduit 11 with the gas generator 12 is arranged between the pretensioner cover 9 and another stationary body 10, such as a pretensioner plate. A stopper spring 13 is positioned inside the conduit 11 to bias the piston 14 against the balls 15, which are serially arranged in the conduit. Activating the gas generator 12 releases pressurized gas to propel the piston 14 against the balls 15 to thereby push against the portion 18*a* of the pretensioner gear 18 extending into the opening to rotate the spool driving gear and rotate the spool 2 wrapping around one end of the seat belt.

In the illustrated embodiment, the conduit 11 has an open end having the side opening or cutout adjacent to it. A guide block 16, which can be made from aluminum, plugs the open end of the conduit 11 so that the balls 15 can eject from the side opening or cutout. The guide block 16 can be fixed to a supporting plate 21 that extends from the cover 9 with a screw 22. The screw 22 also serves to fixing the conduit 11 to the supporting plate 21. Sections 23 and 24 are sections of the cover 9; the section 23 further supports the conduit 11 and the section 24 defines a ball-receiving area 25.

Instead of the projections 17, pins (not illustrated) can be inserted through respective openings in the cover 9 and the pretensioner gear 18. Inserting pins into the respective holes of the cover 9 and the pretensioner gear 18 to connect them together, however, increases the number of components, as well as complicating the assembly. It is desirable to reduce the number of parts and simplify the assembly. This can be achieved with the projections 17, which can be integrally formed with either the cover 9 or the pretensioner gear 18.

FIG. 1 illustrates the embodiment of the cover 9 having two integrally, i.e., monolithically, formed projections 17*a* and 17*b*, which can be die-casted of aluminum. The projections 17*a* and 17*b* may be simple projections, such as dowels or bar rings. They can be also tapered. The pretensioner gear 18 can have two complementary holes 18*c* and 18*d* on one side thereof in registry with the projections 17*a* and 17*b*. The projections 17*a* and 17*b* are inserted into the respective holes 18*c* and 18*d* so that the pretensioner gear 18 is immobilized relative to the cover 9. The projections 17*a*, 17*b*, which extend in an axial direction from the cover 9, are inserted into the respective openings 18*c*, 18*d* formed in the pretensioner gear 18 to hold the pretensioner gear 18 in place.

Figure 3:
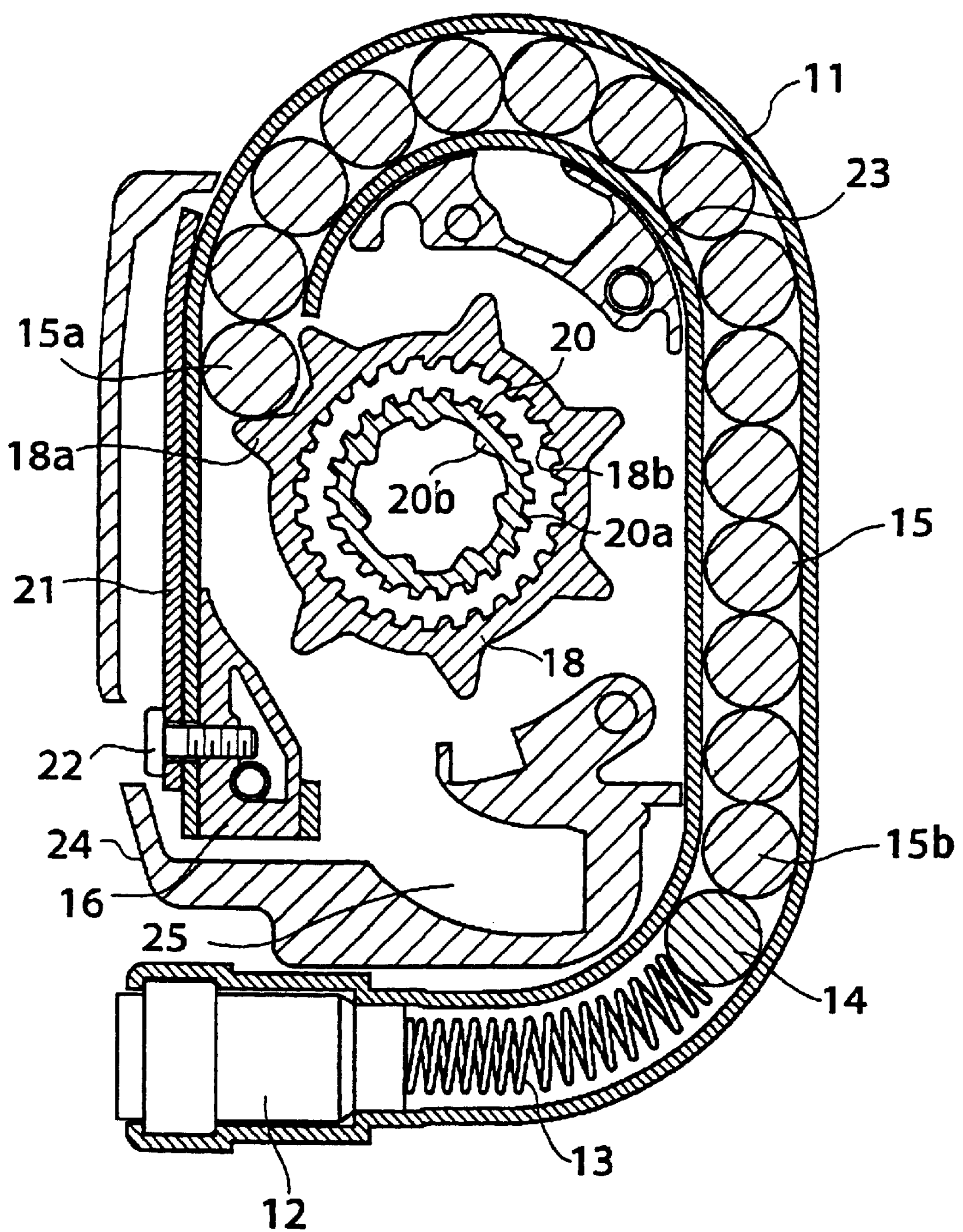
FIG. 3 is a cross-sectional view of an example of the pretensioner according to the present invention.

Referring to FIG. 3, the pretensioner gear 18, for example, can be a ring gear having outer teeth 18*a* and inner teeth 18*b*. The spool driving gear 20 also can be a pinion or ring gear having outer teeth 20*a* and inner teeth 20*b*. The spool 2 further has a spool gear 19 that engages the inner teeth 20*b* of the spool driving gear 20. In a normal state, the projections 17 position the pretensioner gear 18 concentrically over the spool driving gear 20 with a spacing therebetween so that the pretensioner gear 18 does not engage the spool driving gear 20. In other words, in the normal state, the projections 17 restrict the pretensioner gear 18 so that its internal teeth 18*b* do not engage the external teeth 20*a* of the spool driving gear 20.

Accordingly, the pretensioner gear 18 has no effect on the rotation of the spool 2 in the normal operating state. But when the gas generator 12 becomes activated, the generated gas propels the piston 14, which in turn pushes the balls 15 so that the first or leading ball 15*a* pushes against the external tooth 18*a* of the pretensioner gear 18 and breaks off the projections 17. This frees the pretensioner gear 18 so that its inner teeth 18*b* engage the outer teeth 20*a* of the spool driving gear. The subsequent balls 15 ejecting from the side opening further rotate the pretensioner gear 18 (in the counterclockwise direction as viewed from FIG. 3), which in turn rotates the spool 2 via the spool driving gear 20 to pretension the seat belt.

The leading ball 15*a* is interposed between one external tooth 18*a* of the pretensioner gear 18 extending through the side opening and an internal wall of the conduit 11, opposite the side opening, to confine the leading ball 15*a*. As the external tooth 18*a* stops the leading ball 15*a*, the subsequent balls 15 are contained inside the conduit 11. The balls 15 can be of steel. The piston 14, which contacts the last or trailing ball 15*b*, can be a ball of the same size as the steel balls 15, but made of silicon. The spring 13 urges the piston 14 to press the balls 15 toward the leading ball 15*a* so that adjacent balls 15 contact each other.

The balls 15 ejecting from the side opening drops down onto the ball-receiving area 25 through a clearance formed between the root side (spacing between the teeth 18*a*) of the outer pretensioner gear teeth 18*a* and the internal side of the conduit 11, while rotating the pretensioner gear 18. Then, the next balls 15 push the next external tooth 18*a* of the pretensioner gear 18 and drop onto the ball-receiving area 25 while further rotating the pretensioner gear 18. The guide block 16 serves to increase the contact range between the balls 15 and the pretensioner gear 18 by forming a guide channel that is dimensioned as close to the diameter of the ball 15 as possible, i.e., providing only a small clearance.

Figure 4A:
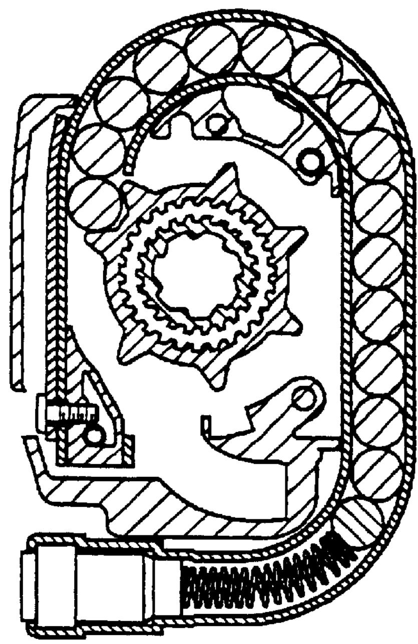
FIGS. 4A–4D illustrate the operation of the pretensioner shown in FIG. 3.

FIGS. 4A–4D schematically illustrate the sequence of the pretensioner operation. FIG. 4A illustrates the initial stage, where the two projections 17 hold the pretensioner gear 18 in a fixed position. Note that the pretensioner gear 18 has a pair of outer teeth 18*a* that are closely spaced to accommodate a single ball 15 therebetween. The rest of the outer teeth 18*a* are spaced to accommodate two balls 15 between an adjacent pair of outer teeth 118*a*. In the fixed (initial) position, the pretensioner gear 18 is positioned so that the lower one of the closely spaced pair of adjacent outer teeth 18*a* holds the leading ball 15*a* in place.

Figure 4B:
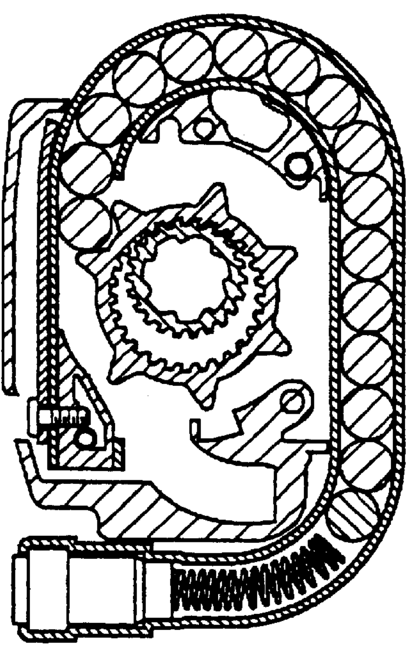

FIG. 4B illustrates the state in which the gas generator 12 has been activated to propel the piston 14 to drive the balls 15 out of the conduit 11. Here, the leading ball 15*a* breaks the pins 17 to free the pretensioner gear 18. The leading ball 15*a* thus positions the pretensioner gear 18 so that its internal teeth 18*b* engage the external teeth 20*a* of the spool driving gear 20.

Figure 4C:
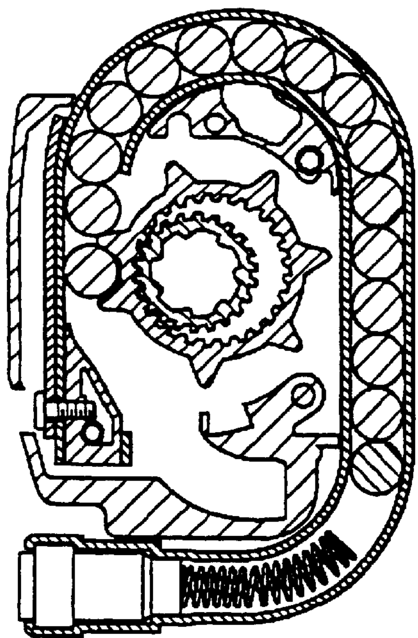
Figure 4D:
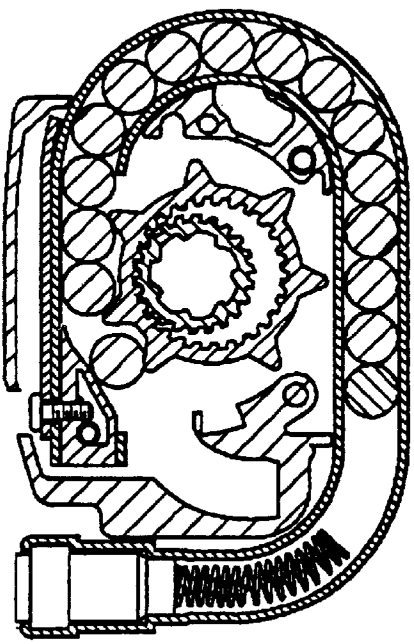

FIGS. 4C and 4D illustrate the state in which the leading ball 15*a* rotates the pretensioner gear 18 to rotate the spool driving gear 20, and the subsequent balls 15 further rotate the pretensioner gear 18 to further rotate the spool driving gear 20, which in turn rotates the spool 2 to tension the seat belt.

When the pretensioner gear 18 and the spool driving gear 20 mesh, the apexes thereof can contact each other. In that case, the engagement does not proceed smoothly when the force urging the pretensioner gear 18 to the spool driving gear 20 is directed toward their centers. To avoid this situation, the position at which the pretensioner gear 18 and the spool driving gear 20 initially mesh is positioned away from the position at which the leading ball 15*a* pushes the pretensioner gear 18. This transfers the force for urging the pretensioner gear 18 and the spool driving gear 20 away from their centers and cause lateral displacement of the pretensioner gear 18 relative to the spool driving gear 20 until they securely mesh.

In the present embodiment, this is achieved by first breaking only one of the projections 17, namely the projection 17*b* that is positioned closer to the ball exit side. Because the projection 17*b* is positioned nearer the leading ball 15*a* where the force applied there is larger than the force is applied to the other projection 17*b*, the one projection 17*b* is broken first. This causes the pretensioner gear 18 to pivot about the other projection 17*a*, as shown in FIG. 4B, so that the inner teeth 18*b* of the pretensioner gear 18 mesh the outer teeth 20*a* of the spool driving gear 20. The other projection 17*a*, which becomes the initial pivotal axis, is positioned at a location that is separated from the location where the leading ball 15*a* pushes the initial external tooth 18*a* of the pretensioner gear 18 by at least a quarter revolution of the circumferential distance of the pretensioner gear 18. Accordingly, as shown in FIG. 4B, the engagement between the pretensioner gear 18 and the spool driving gear 20 occurs at a position remote from the position at which the leading ball 15*a* initially pushes the pretensioner gear 18.

As illustrated in FIG. 4B, the meshing initially occurs around the top sector of the spool driving gear 20. Therefore, when the teeth mesh, a lateral sliding force is generated to slide the pretensioner gear 18 laterally against the spool driving gear 20 so that the teeth mesh properly. During the meshing stage of the pretensioner gear 18 and the spool driving gear 20, the downward force from the leading ball 15*a* breaks the other projection 17*a* and allows the pretensioner gear 18 to rotate to drive the pinion 20, as shown in FIGS. 4C and 4D.

Since the cover 9 can be formed by aluminum die-casting, it is easy to form the projections 17*a* and 17*b* integrally with the cover 9. The projections 17*a* and 17*b* are configured so that they break when only a small force is applied to the pretensioner gear 18.

As shown in FIG. 1, the holes 18*c*, 18*d* do not penetrate through the pretensioner gear 18. Therefore, the broken projections 17*a* and 17*b* cannot spring out of the pretensioner gear 18 from the side opposite the holes 18*c*, 18*d* so as to prevent any obstruction of the rotation of the pretensioner gear 18. When such obstruction is not possible, such as when the plate 10 is closely positioned adjacent to the side, then the holes 18*c*, 18*d* can extend through.

In the example shown in FIG. 1, the projections 17*a* and 17*b* are formed in the cover 9 while the holes 18*c* and 18*d* are formed in the pretensioner gear 18. The projections and the holes can be reversed so that the projections 17*a*, 17*b* are formed in the pretensioner gear 18 and the holes 18*c*, 18*d* in the cover 9. The pretensioner gear 18, however, is generally manufactured by forging, so that such projections are generally more difficult to form. Moreover, the diameter of such forged projection should be small because the gear is made from a strong material. Nonetheless, forming the projections on the gear 18 can be another option.

Since separate pins are not necessary, the number of components is reduced, while simplifying the assembly. Moreover, because the holes 18*c*, 18*d* do not extend through, the broken projections 17*a*, 17*b* do not interfere with the operation of the pretensioner. Moreover, the force needed to break the projections 17*a*, 17*b* is small so that more energy can be directed to driving the spool.

The disclosure of the priority application, JP 2000-122067, filed Apr. 24, 2000, in its entirety, including the drawings, claims, and the specification thereof, is incorporated herein by reference.

We claim:

1. A seat belt retractor comprising:

a spool for tensioning a seat belt; and a pretensioner comprising:

a stationary body;

a pretensioner gear attached to the stationary body with a plurality of integrally formed breakable projections inserted into a plurality of complementary holes so that the pretensioner gear is immobilized relative to the stationary body;

a spool driving gear for rotating the spool, the spool driving gear being spaced and disengaged from the pretensioner gear so that the pretensioner gear does not interfere with normal operation of the spool; and a pretensioner gear driving mechanism for engaging the pretensioner gear with the spool driving gear and driving the pretensioner gear, wherein one of the pretensioner gear and the stationary body has the integrally formed breakable projections and the other of the pretensioner gear and the stationary body has the complementary holes, wherein the pretensioner gear driving mechanism drives the pretensioner gear to break the projections and mobilize the pretensioner gear, engage the pretensioner gear with the spool driving gear, and drive the spool driving gear, which rotates the spool and tension the seat belt; and wherein the pretensioner gear driving mechanism comprises:

a conduit having an opening, the pretensioner gear being positioned adjacent to the opening so that part of the pretensioner gear extends into the opening;

a plurality of balls positioned inside the conduit for driving the pretensioner gear;

a ball propelling mechanism for moving the balls inside the conduit, wherein the ball propelling mechanism forces the balls against the portion of the pretensioner gear extending into the opening to break the projections, engage the pretensioner gear with the spool driving gear, and rotate the spool driving gear to tension the seat belt.

2. A seat belt retractor according to claim 1, wherein the breakable projections are integrally formed with the stationary body and the complementary holes are formed on one side of the pretensioner gear.

3. A seat belt retractor according to claim 2, wherein the complementary holes are blind holes to retain broken projections within the holes.

4. A seat belt retractor according to claim 2, wherein the stationary body and the projections are aluminum.

5. A seat belt retractor according to claim 2, wherein the stationary body is a cover.

6. A seat belt retractor according to claim 1, wherein the ball propelling mechanism comprises:

a gas generator disposed at one end of the conduit; and a piston situated inside the conduit for propelling the balls against the portion of the pretensioner gear extending into the opening.

7. A seat belt retractor according to claim 1, wherein the breakable projections are integrally formed with the stationary body and the complementary holes are formed on one side of the pretensioner gear.

8. A seat belt retractor according to claim 7, wherein the projections comprise first and second projections, the first projection being positioned closer to the opening through which a leading ball exits than the second projection so that the leading ball exiting the conduit breaks the first projection first, and then breaks the second projection.

9. A seat belt retractor according to claim 8, wherein the pretensioner gear is a ring gear having outer teeth and inner teeth, and the spool driving gear is also a ring gear having outer teeth and inner teeth, the spool including a spool gear that engages the inner teeth of the spool driving gear.

10. A seat belt retractor according to claim 9, wherein the balls engage the outer teeth of the pretensioner gear and the outer teeth of the spool driving gear engage the inner teeth of the pretensioner gear.

11. A seat belt retractor according to claim 10, wherein the second projection is positioned away from the first projection so that when the first projection breaks, the pretensioner gear pivots about the second projection to cause the inner teeth of the pretensioner gear to engage the outer teeth of the spool driving gear away from a position at which the leading ball pushes the pretensioner gear.

12. A seat belt retractor according to claim 11, wherein the second projection is spaced away from the first projection by at least a quarter of the circumferential distance of the pretensioner gear.

13. A pretensioner for a seat belt retractor having a spool for tensioning a seat belt, comprising:

a stationary body;

a pretensioner gear attached to the stationary body with a plurality of integrally formed breakable projections inserted into a plurality of complementary holes so that the pretensioner gear is immobilized relative to the stationary body;

a spool driving gear for rotating the spool, the spool driving gear being spaced and disengaged from the pretensioner gear so that the pretensioner gear does not interfere with normal operation of the spool; and a pretensioner gear driving mechanism for engaging the pretensioner gear with the spool driving gear and driving the pretensioner gear, wherein one of the pretensioner gear and the stationary body has the integrally formed breakable projections and the other of the pretensioner gear and the stationary body has the complementary holes, wherein the pretensioner gear driving mechanism drives the pretensioner gear to break the projections and mobilize the pretensioner gear, engage the pretensioner gear with the spool driving gear, and drive the spool driving gear, which rotates the spool and tension the seat belt; and wherein the pretensioner gear driving mechanism comprises:

a conduit having an opening, the pretensioner gear being positioned adjacent to the opening so that part of the pretensioner gear extends into the opening;

a plurality of balls positioned inside the conduit for driving the pretensioner gear;

a ball propelling mechanism for moving the balls inside the conduit, wherein the ball propelling mechanism forces the balls against the portion of the pretensioner gear extending into the opening to break the projections, engage the pretensioner gear with the spool driving gear, and rotate the spool driving gear to tension the seat belt.

14. A pretensioner according to claim 13, wherein the ball propelling mechanism comprises:

a gas generator disposed at one end of the conduit; and a piston situated inside the conduit for propelling the balls against the portion of the pretensioner gear extending into the opening.

15. A pretensioner according to claim 13, wherein the breakable projections are integrally formed with the stationary body and the complementary holes are formed on one side of the pretensioner gear.

16. A pretensioner according to claim 15, wherein the complementary holes are blind holes to retain broken projections within the holes.

17. A pretensioner according to claim 15, wherein the stationary body and the projections are aluminum.

18. A pretensioner according to claim 15, wherein the stationary body is a cover.

* * * * *